United States Patent
zur Loye et al.

(10) Patent No.: US 9,464,583 B2
(45) Date of Patent: Oct. 11, 2016

(54) CYLINDER PRESSURE BASED CONTROL OF DUAL FUEL ENGINES

(71) Applicant: Cummins Inc., Columbus, IN (US)

(72) Inventors: Axel Otto zur Loye, Columbus, IN (US); Geomy George, Indianapolis, IN (US); Timothy P. Lutz, Columbus, IN (US); Steven J. Kolhouse, Columbus, IN (US); C. Larry Bruner, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 276 days.

(21) Appl. No.: 14/174,276

(22) Filed: Feb. 6, 2014

(65) Prior Publication Data
US 2015/0219027 A1  Aug. 6, 2015

(51) Int. Cl.
| | |
|---|---|
| *F02D 13/02* | (2006.01) |
| *F02D 19/06* | (2006.01) |
| *F02D 41/00* | (2006.01) |
| *F02M 25/07* | (2006.01) |
| *F02B 3/06* | (2006.01) |
| *F02D 19/10* | (2006.01) |
| *F02D 35/02* | (2006.01) |
| *F02B 37/16* | (2006.01) |
| *F02B 37/18* | (2006.01) |

(52) U.S. Cl.
CPC ....... *F02D 41/0027* (2013.01); *F02D 13/0215* (2013.01); *F02D 19/105* (2013.01); *F02D 35/023* (2013.01); *F02D 41/0002* (2013.01); *F02D 41/0025* (2013.01); *F02M 26/05* (2016.02); *F02M 26/06* (2016.02); *F02M 26/24* (2016.02); *F02M 26/25* (2016.02); *F02B 3/06* (2013.01); *F02B 37/16* (2013.01); *F02B 37/18* (2013.01); *F02D 19/0647* (2013.01); *F02D 35/027* (2013.01); *F02D 41/0007* (2013.01); *F02D 2041/001* (2013.01); *Y02T 10/18* (2013.01); *Y02T 10/36* (2013.01); *Y02T 10/42* (2013.01)

(58) Field of Classification Search
CPC ............ F02D 13/0215; F02D 19/105; F02D 19/0647; F02D 35/023; F02D 41/0002; F02D 41/0025; F02D 41/0027; F02D 2041/001; F02D 35/027; F02D 41/0007; F02M 25/0707; F02M 25/0709; F02M 25/0728; F02M 25/0732; F02B 3/06; F02B 37/16; F02B 37/18; Y02T 10/18; Y02T 10/36; Y02T 10/42
USPC .................... 60/602, 605.2; 123/563, 568.15
See application file for complete search history.

(56) References Cited

U.S. PATENT DOCUMENTS

| | | | |
|---|---|---|---|
| 4,920,494 | A | 4/1990 | Abo et al. |
| 5,878,717 | A | 3/1999 | zur Loye |

(Continued)

FOREIGN PATENT DOCUMENTS

| | | |
|---|---|---|
| JP | 6159182 | 6/1994 |
| WO | 2011002353 | 1/2011 |
| WO | 2011153069 | 12/2011 |

*Primary Examiner* — Jesse Bogue
*Assistant Examiner* — Dapinder Singh
(74) *Attorney, Agent, or Firm* — Taft Stettinius & Hollister LLP

(57) ABSTRACT

Systems and methods for controlling operation of dual fuel internal combustion engines in response to cylinder pressure based determinations are disclosed. The techniques control fuelling contributions from a first fuel source and a second fuel source to achieve desired operational outcomes in response to the cylinder pressure based determinations.

30 Claims, 5 Drawing Sheets

(56) References Cited

U.S. PATENT DOCUMENTS

| | | |
|---|---|---|
| 6,276,334 B1 | 8/2001 | Flynn et al. |
| 6,289,871 B1 | 9/2001 | Brown et al. |
| 6,659,071 B2 * | 12/2003 | LaPointe .................. F02B 1/12 123/295 |
| 7,000,596 B2 | 2/2006 | Zurloye et al. |
| 7,325,529 B2 | 2/2008 | Ancimer et al. |
| 8,068,971 B2 | 11/2011 | Hamedovic et al. |
| 8,706,386 B2 * | 4/2014 | Kurtz .................. F02D 41/0025 701/109 |
| 2008/0308067 A1 | 12/2008 | Schuckert et al. |
| 2012/0103304 A1 | 5/2012 | Kang et al. |

* cited by examiner

CYLINDER PRESSURE BASED CONTROL OF DUAL FUEL ENGINES

FIELD OF THE INVENTION

The present invention relates generally to dual fuel internal combustion engines, and more particularly is concerned with cylinder pressure based control of a dual fuel internal combustion engine.

BACKGROUND

A dual fuel engine is an engine that includes a first fuel source that is utilized as the sole fuel source during certain operating conditions and a second fuel source that is integrated with the first fuel source at other operating conditions. In certain applications, the first fuel source is a diesel fuel and the second fuel source is natural gas. The diesel fuel provides the initial, low load levels of operation and is used for ignition for the natural gas at higher load operations. The substitution of natural gas for diesel fuel improves high load performance and emissions reduction, particularly when the engine is employed at locations where natural gas is abundant or available at low cost.

When the engine is operating in dual fuel mode, natural gas is introduced into the intake system. The air-to-natural gas mixture from the intake is drawn into the cylinder, just as it would be in a spark-ignited engine, but typically with a leaner air-to-fuel ratio. Near the end of the compression stroke, diesel fuel is injected, just as it would be in a traditional diesel engine. The diesel fuel ignites, and the diesel combustion causes the natural gas to burn. The dual fuel engine combusts a mixture of air and fuel in the cylinders to produce drive torque. A dual fuel engine can operate either entirely on diesel fuel or on the substitution mixture of diesel and natural gas, but cannot operate on natural gas alone. However, the dual fuel engine typically delivers the same power density, torque curve and transient response as the base diesel engine does.

Dual fuel engines encounter difficulties during operation to provide the optimal balance of diesel fuel energy and natural gas energy. The amount and heating value of diesel fuel that is delivered to the combustion chambers of the cylinders is readily determined, and thus the energy provided by the diesel fuel can be readily determined. However, it is difficult to determine an accurate flow rate or quantity of natural gas that is delivered to the cylinders. In addition, the heating value of natural gas is not constant. As a result, current techniques for determining and providing a substitution rate of natural gas for diesel fuel in the dual fuelling mode often result in less than the optimal balance between diesel fuelling and natural gas fuelling being achieved. Thus, there remains a need for additional improvements in systems and methods for providing and controlling fuelling in dual fuel engines.

SUMMARY

Unique systems and methods are disclosed for controlling operation of a dual fuel engine in response to an operating condition determined from a pressure determination in at least one cylinder of the engine. During operation, the at least one cylinder receives fuelling from a liquid fuel source and a gaseous fuel source. The systems and methods include determining a pressure of at least one cylinder of the engine, and determining an operating condition of the at least one cylinder in response to the pressure determination.

In one embodiment, operating condition is a total energy output of the at least one cylinder. A contribution of the liquid fuel to the total energy output is determined from the flow rate and heating value of the liquid fuel, and the contribution of the gaseous fuel is determined from a difference between the total energy output and the contribution of the liquid fuel to the total energy output. The substitution rate of gaseous fuel for the liquid fuel is adjusted in response to the contribution of the gaseous fuel deviating from a target contribution of the gaseous fuel to the total energy output.

In a further embodiment, the operating condition of the at least one cylinder determined by the pressure measurement includes an indicated mean effective pressure (IMEP) of the cylinder. As used herein, IMEP can be the gross IMEP calculated for the 360 crank degrees which include the compression stroke and the expansion stroke, or the NIMEP, which is calculated over the complete engine cycle (720 degrees for a four stroke cycle engine), or it can be a cylinder pressure measurements that correlates with the IMEP. Since IMEP is an indication of the total torque output of the engine, the adjustment of the substitution rate for the gaseous fuel adjusts the torque contribution of the gaseous fuel to the total torque output. In yet a further embodiment, the operating condition of the at least one cylinder includes a peak cylinder pressure that is monitored and corrective actions are taken, such as reducing boost pressure, to prevent over-pressurization of the cylinder.

In another embodiment, the operating condition of the at least one cylinder includes a combustion parameter that is determined from the pressure measurement. Deviations in the combustion parameter from a target combustion parameter are controlled by adjusting the fuelling commands for the liquid fuel source and/or the gaseous fuel source. The combustion parameter may include any one or combination of a heat release rate or heat release placement of the combustion in the cylinder, an effective expansion ratio of the cylinder, a centroid of heat release of the combustion in the cylinder, a pressure ratio in the cylinder, and a knock condition in the cylinder.

In another embodiment, the charge flow to the cylinder is controlled by the determination of the contribution of the gaseous fuelling to the total energy output. For example, in one embodiment the air-to-fuel ratio or lambda of the charge flow to the at least one cylinder is controlled. A target lambda of the charge flow in response to engine operating conditions can be determined, for example, from look-up tables stored in a memory of a controller. The actual lambda of the charge flow can be determined by dividing the mass air flow of the charge flow with the energy contribution of the gaseous fuel to the energy output of the cylinder. The actual charge flow lambda is then compared to the target charge flow lambda, and adjustments in the substitution rate of the gaseous fuelling, the intake air flow, and/or the EGR flow can be made to compensate for any differences. The charge flow could also or alternatively be controlled toward the target charge lambda by operation of a wastegate of a turbine, a variable geometry turbine, an intake throttle, a compressor bypass valve, or a combination of these. In still other embodiments, the charge flow lambda is controlled to meet a target heat release placement or rate, an effective expansion ratio, and/or a parameter indicative of a centroid of heat release of the combustion in the cylinder.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
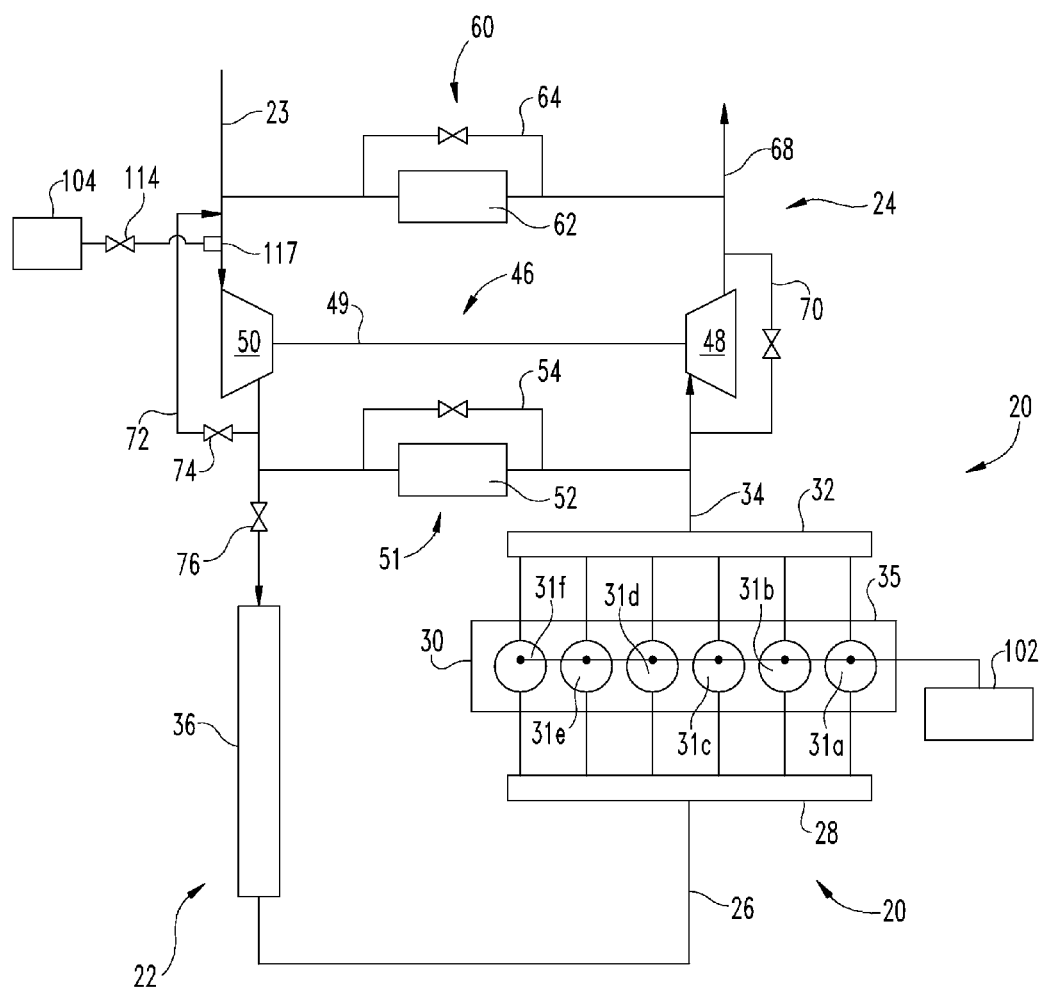
FIG. 1 is a schematic illustration of a portion of an internal combustion engine system with a dual fuel system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 2:
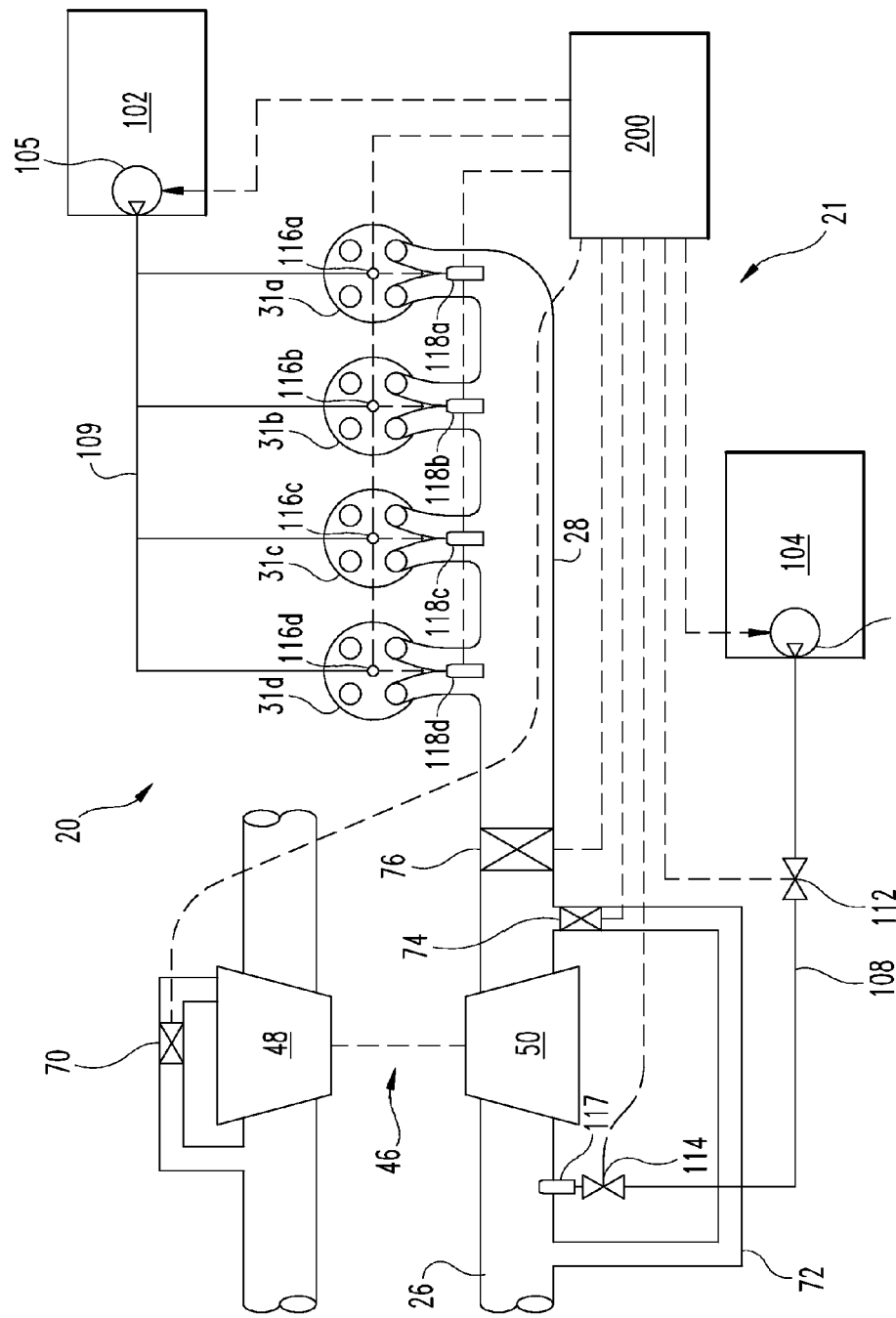
FIG. 2 is a schematic illustration of another portion of the internal combustion engine system of FIG. 1 showing various embodiments of a dual fueling system.

With reference to FIGS. 1 and 2, an internal combustion engine system 20 is illustrated in schematic form. A fueling system 21 is also shown in schematic form that is operable with internal combustion engine system 20 to provide fueling for engine 30 from a first fuel source 102 and a second fuel source 104. Internal combustion engine system 20 includes engine 30 connected with an intake system 22 for providing a charge flow to engine 30 and an exhaust system 24 for output of exhaust gases. In certain embodiments, the engine 30 includes a lean combustion engine such as a diesel cycle engine that uses a primary fuel from first fuel source 102 that is a liquid fuel such as diesel fuel and a secondary fuel from second fuel source that is a gaseous fuel. The secondary fuel can be, for example, natural gas, bio-gas, methane, propane, ethanol, producer gas, field gas, liquefied natural gas, compressed natural gas, or landfill gas. However, other types of primary and secondary fuels are not precluded, such as any suitable liquid fuel and gaseous fuel. In the illustrated embodiment, the engine 30 includes six cylinders 31a-31f in an in-line arrangement. However, the number of cylinders (collectively referred to as cylinders 31) may be any number, and the arrangement of cylinders 31 may be any arrangement, and is not limited to the number and arrangement shown in FIG. 1. In still other embodiments, engine 30 is a rotary engine.

Engine 30 includes an engine block 35 that at least partially defines the cylinders 31. A plurality of pistons 130 (FIG. 3) may be slidably disposed within combustion chambers 132 of the respective cylinders 31 to reciprocate between a top-dead-center position and a bottom-dead-center position. Each of the cylinders 31, its respective piston 130, and the cylinder head 134 form a combustion chamber 132. In the illustrated embodiment, engine 30 includes six such combustion chambers 132. However, it is contemplated that engine 30 may include a greater or lesser number of cylinders 31 and combustion chambers 132 and that cylinders 31 and combustion chambers 132 may be disposed in an "in-line" configuration, a "V" configuration, or in any other suitable configuration.

In one embodiment, engine 30 is a four stroke engine. That is, for each complete combustion cycle (i.e., for every two full crankshaft rotations), each piston 130 of each cylinder 31 moves through an intake stroke, a compression stroke, a combustion or power stroke, and an exhaust stroke. Thus, during each complete cycle for the depicted six cylinder engine, there are six strokes during which air is drawn into individual combustion chambers 132 from intake supply conduit 26 and six strokes during which exhaust gas is supplied to exhaust manifold 32.

The engine 30 includes cylinders 31 connected to the intake system 22 to receive a charge flow and connected to exhaust system 24 to release exhaust gases produced by combustion of the primary and/or secondary fuels. Exhaust system 24 may provide exhaust gases to a turbocharger 46, although a turbocharger is not required. In still other embodiments, multiple turbochargers are included to provide high pressure and low pressure turbocharging stages that compress the intake flow.

Furthermore, exhaust system 24 can be connected to intake system 22 with one or both of a high pressure exhaust gas recirculation (EGR) system 51 and a low pressure EGR system 60. EGR systems 51, 60 may include a cooler 52, 62 and bypass 54, 64, respectively. In other embodiments, one or both of EGR systems 51, 60 are not provided. When provided, EGR system(s) 51, 60 provide exhaust gas recirculation to engine 30 in certain operating conditions. In any EGR arrangement during at least certain operating conditions, at least a portion the exhaust output of cylinder(s) 31 is recirculated to the engine intake system 22. In the high pressure EGR system 51, the exhaust gas from the cylinder(s) 31 takes off from exhaust system 24 upstream of turbine 48 of turbocharger 46 and combines with intake flow at a position downstream of compressor 50 of turbocharger 46 and upstream of an intake manifold 28 of engine 30. In the low pressure EGR system 60, the exhaust gas from the cylinder(s) 31a-31f takes off from exhaust system 24 downstream of turbine 48 of turbocharger 46 and combines with intake flow at a position upstream of compressor 50 of turbocharger 46. The recirculated exhaust gas may combine with the intake gases in a mixer (not shown) of intake system 22 or by any other arrangement. In certain embodiments, the recirculated exhaust gas returns to the intake manifold 28 directly.

Intake system 22 includes one or more inlet supply conduits 26 connected to an engine intake manifold 28, which distributes the charge flow to cylinders 31 of engine 30. Exhaust system 24 is also coupled to engine 30 with an engine exhaust manifold 32. Exhaust system 24 includes an exhaust conduit 34 extending from exhaust manifold 32 to turbine 48 of turbocharger 46. In one embodiment, exhaust conduit 34 is flowed coupled to exhaust manifold 32, and may also include one or more intermediate flow passages, conduits or other structures.

Exhaust conduit 34 extends to turbine 48 of turbocharger 46. Turbocharger 46 may be any suitable turbocharger known in the art, including variable-geometry turbine turbochargers and waste-gated turbochargers. Turbocharger 46 may also include multiple turbochargers. Turbine 48 is connected via a shaft 49 to compressor 50 that is flow coupled to inlet supply conduit 26. Turbine 48 of the illustrated embodiment further includes a controllable wastegate 70 or other suitable bypass that is operable to selectively bypass at least a portion of the exhaust flow from turbine 48 to reduce boost pressure and engine torque under certain operating conditions. In another embodiment, turbine 48 is a variable geometry turbine with an inlet that is selectively modulated to permit a desired amount of exhaust flow therethrough.

An aftertreatment system (not shown) can be connected with an outlet conduit 68. The aftertreatment system may include, for example, oxidation devices (DOC), particulate removing devices (DPF, CDPF), constituent absorbers or reducers (SCR, AMOX, LNT), reductant systems, and other components if desired.

Compressor 50 receives fresh air flow from intake air supply conduit 23. Second fuel source 104 may also be flow coupled at or adjacent the inlet to compressor 50 which compresses fuel from second fuel source 104 with the charge flow for delivery to combustion chambers 132 of cylinders 31. Intake system 22 further includes a compressor bypass 72 that connects a downstream or outlet side of compressor 50 to an upstream or inlet side of compressor 50. Compressor bypass 72 includes a control valve 74 that is selectively opened to allow charge flow to be returned to the inlet side of compressor 50 to reduce compressor surge under certain operating conditions, such as when an intake throttle 76 is closed. Inlet supply conduit 26 may include a charge air cooler 36 downstream from compressor 50 and intake throttle 76. In another embodiment, a charge air cooler 36 is located in the intake system 22 upstream of intake throttle 76. Charge air cooler 36 may be disposed within inlet air supply conduit 26 between engine 30 and compressor 50, and embody, for example, an air-to-air heat exchanger, an air-to-liquid heat exchanger, or a combination of both to facilitate the transfer of thermal energy to or from the flow directed to engine 30.

In operation of internal combustion engine system 20, fresh air is supplied through inlet air supply conduit 23. The fresh air flow or combined flows can be filtered, unfiltered, and/or conditioned in any known manner, either before or after mixing with the EGR flow from EGR systems 51, 60 when provided. The intake system 22 may include components configured to facilitate or control introduction of the charge flow to engine 30, and may include intake throttle 76, one or more compressors 50, and charge air cooler 36. The intake throttle 76 may be connected upstream or downstream of compressor 50 via a fluid passage and configured to regulate a flow of atmospheric air and/or combined air/EGR flow to engine 30. Compressor 50 may be a fixed or variable geometry compressor configured to receive air or air and fuel mixture from fuel source 104 and compress the air or combined flow to a predetermined pressure level before engine 30. The charge flow is pressurized with compressor 50 and sent through charge air cooler 36 and supplied to engine 30 through intake supply conduit 26 to engine intake manifold 28.

With further reference to FIG. 2, fuel system 21 is configured to provide dual fuelling of engine 30. Fuel system 21 includes first fuel source 102 and second fuel source 104. First fuel source 102 is configured to provide a flow of a first liquid fuel to cylinders 31 with one or more injectors at or near each cylinder 31. Second fuel source 104 is connected to intake system 22 with a mixer just upstream of an inlet of compressor 50 to provide a flow of a second,
gaseous fuel to the combustion chamber 132 of each cylinder 31. In certain embodiments, the cylinders 31 each include at least one of a port injector or a direct injector for delivering fuel to the combustion chamber thereof from a primary fuel source, such as first fuel source 102. In addition, an injector at compressor 50 can be provided for delivery or induction of fuel from the second fuel source 104 with the charge flow delivered to cylinders 31.

The fueling from the first fuel source 102 is controlled to provide the sole fueling at certain operating conditions of engine 30, and fueling from the second fuel source 104 is provided to substitute for fueling from the first fuel source 102 at other operating conditions to provide a dual flow of fuel to engine 30. In embodiments where the first fuel source 102 is diesel fuel and the second fuel source 104 is natural gas, a control system including controller 200 is configured to control the flow of liquid diesel fuel from first source 102 and, under certain operating condition, control the flow of gaseous fuel from second source 104 in accordance with engine speed, engine loads, intake manifold pressures, and fuel pressures, for example. In one embodiment, a target substitution rate of gaseous fuel from second fuel source 104 is determined according to look-up tables stored in controller 200. One example of a gas substitution control system and method for a dual fuel engine is disclosed in PCT Publication No. WO 2011/153069 published on Dec. 8, 2011, which is incorporated herein by reference.

A direct injector, as utilized herein, includes any fuel injection device that injects fuel directly into the cylinder volume, and is capable of delivering fuel into the cylinder volume when the intake valve(s) and exhaust valve(s) are open and/or closed. The direct injector may be structured to inject fuel at the top of the cylinder or laterally of the cylinder. In certain embodiments, the direct injector may be structured to inject fuel into a combustion pre-chamber. Each cylinder 31, such as the illustrated cylinders 31a-d in FIG. 2 (cylinders 31e and 31f omitted for brevity, it being understood that any cylinder arrangement and number as discussed herein is contemplated) may include one or more direct injectors 116a-116d, respectively. The direct injectors 116a-116d may be the primary fueling device for first fuel source 102 for the cylinders 31a-31d.

A port injector, as utilized herein, includes any fuel injection device that injects fuel outside the engine cylinder in the intake manifold to form the air-fuel mixture. The port injector sprays the fuel towards the intake valve. During the intake stroke, the downwards moving piston draws in the air/fuel mixture past the open intake valve and into the combustion chamber. Each cylinder 31 may include one or more port injectors 118a-118d, respectively. In one embodiment, the port injectors 118a-118d may be the primary fueling device for first fuel source 102 to the cylinders 31a-31d. In the illustrated embodiment, the second fuel source 104 can be connected to intake system 22 with a mixer 117 upstream of intake manifold 28, such as at or upstream of the inlet to compressor 50.

In certain embodiments, each cylinder 31 includes one of a port or direct injector that is capable of providing all of the designed primary fueling amount from first fuel source 102 for the cylinders 31 at any operating condition. Second fuel source 104 provides a flow of a second fuel to each cylinder 31 through a natural gas injector upstream of intake manifold 28 to provide a second fuel flow to the cylinders 31 to achieve desired operational outcomes, such as improved efficiency, improved fuel economy, improved high load operation, and other outcomes.

One embodiment of system 20 includes fuel system 21 with at least one fuel source 102 to provide a primary fuel flow to all the cylinders 31 and a second fuel source 104 that provides a second fuel flow to all the cylinders 31 in addition to the primary fuel flow under certain operating conditions. First fuel source 102 includes a first fuel pump 105 that is connected to controller 200, and the second fuel source 104 is pressurized and/or may include a second fuel pump 106 that is connected to controller 200. Each of the cylinders 31 includes an injector, such as direct injectors 116a-116d or port injectors 118a-118d associated with each of the illustrated cylinders 31a-31d of FIG. 2. First fuel pump 105 is connected to each of the direct injectors 116a-116d and/or injectors 118a-118d with a first fuel line 109. First fuel pump 105 is operable to provide a first fuel flow from first fuel source 102 to each of the cylinders 31a-31d in a rate, amount and timing determined by controller 200 that achieves a desired power and exhaust output from cylinders 31 from first fuel source 102.

Second fuel source 104 is connected to the inlet of compressor 50 with mixer 117 with a second fuel line 108. A shutoff valve 112 can be provided in fuel line 108 and/or at one or more other locations in fuel system 21 that is connected to controller 200. Second fuel pump 106 is operable to provide a second fuel flow from second fuel source 104 in an amount determined by controller 200 that achieves a desired power and exhaust output from cylinders 31 with fuel from second fuel source 104. In another embodiment, second fuel pump 106 is omitted and fuel is supplied to a flow control valve 114 under pressure from a pressurized second fuel source 104. In still another embodiment, fuel from second fuel source 104 is provided directly to the combustion chambers of cylinders 31.

Direct injectors 116a-116d or port injectors 118a-118d and flow control valve 114 are electrically connected with controller 200 to receive fueling commands that provide a fuel flow from first and second fuel sources 102, 104 to the respective cylinder 31 in accordance with fuel commands determined according to engine operating conditions and operator demand by reference to fueling maps, control algorithms, or other fueling rate/amount determination source stored in controller 200. Controller 200 can be connected to actuators, switches, or other devices associated with fuel pumps 105, 106, shutoff valve 112, intake throttle 76, compressor bypass valve 74, wastegate 70, flow control valve 114, injectors 116, 118, and/or intake valve 140 and exhaust valve 142 and configured to provide control commands thereto that regulate the amount, timing and duration of the flows of the first and second fuels to cylinders 31, the charge flow, and the exhaust flow to provide the desired power and exhaust output.

Figure 3:
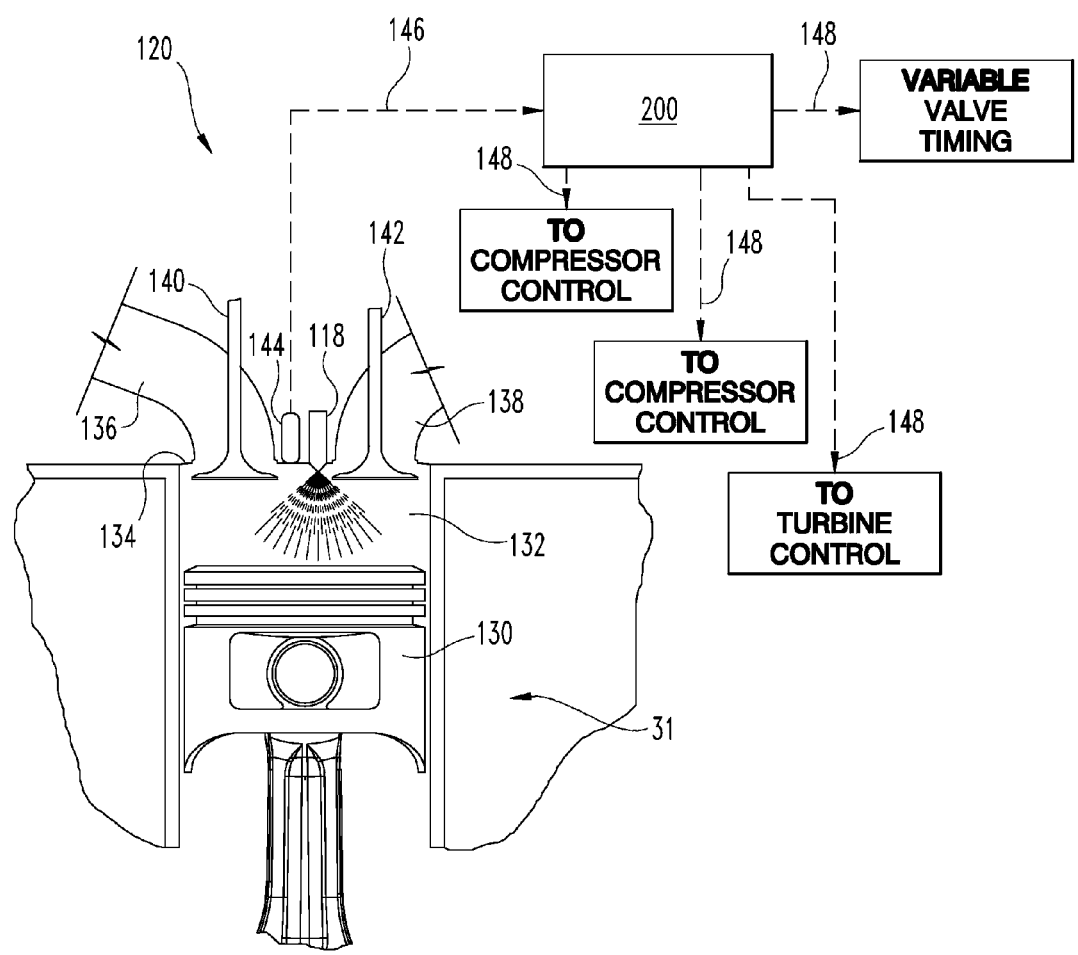
FIG. 3 is a schematic illustration of a cylinder of the internal combustion engine system of FIG. 1 showing a sensor connected with a controller.

Referring now to FIG. 3, there is shown a cylinder 31 including piston 130 housed in a combustion chamber 132 and a control system of the present invention, indicated generally at 120. FIG. 3 shows a single engine cylinder 31 of the multi-cylinder reciprocating piston type engine shown in FIGS. 1-2. Of course, the control system of the present invention could be used to control fuel delivery and combustion in an engine having only a single cylinder or any number of cylinders, for example, a four, six, eight or twelve cylinder or more internal combustion engine. In addition, control system 120 may be adapted for use on any internal combustion engine having compression, combustion and expansion events, including a rotary engine and a free piston engine.

As shown in FIG. 3, piston 130 is reciprocally mounted in the cylinder 31 to form combustion chamber 132. The piston 130 transmits forces generated by a combustion event into a conventional engine drive system. Referring to FIGS. 1-2, an intake air system 22 including intake manifold 28 supplies intake air, or an air/fuel mixture to a respective intake port 136 associated with each cylinder 31. Likewise, exhaust gas system 24 including exhaust manifold 32 receives exhaust gases flowing from exhaust ports 138. One or more intake valves, such an intake valve 140 and one or more exhaust valves, such as exhaust valve 142, are moved between open and closed positions by a conventional valve control system, or a variable valve timing system, to control the flow of intake air or air/fuel mixture into, and exhaust gases out of, the cylinder 31, respectively.

The control system 120 includes an output sensor 144 for sensing or detecting an engine operating condition indicative of the combustion in combustion chamber 132 and generating a corresponding signal 146. Output sensor 144 permits effective combustion control capability by detecting an engine operating condition or parameter directly related to, or indicative of, the combustion event during the compression and/or expansion strokes. For example, output sensor 144 can be a cylinder pressure sensor and may be provided on any or all engine cylinders for sensing, on a cycle-by-cycle basis, the indicated mean effective pressure (IMEP). In this case, the sensor 144 can also provide other engine condition data, such as the knock intensity, start of combustion, combustion rate, combustion duration, crank angle at which peak cylinder pressure occurs, combustion event or heat release placement, effective expansion ratio, a parameter indicative of a centroid of heat release placement, location and end of combustion data, any one of which may be used instead of or in addition to IMEP. In still other embodiments, sensor 144 can provide pressure ratio data in combustion chamber 132. Examples of pressure ratio data are provide in U.S. Pat. No. 5,878,717, which is incorporated herein by reference in its entirety for all purposes.

Sensor 144 provides feedback control to controller 200. Controller 200 receives signal 146, processes the signal and determines an actual operating condition associated with the combustion in combustion chamber 132. Since the contribution of liquid fuel from the first fuel source 102 can be readily determined from, for example, a known or measured flow rate of the liquid fuel supplied during the combustion event and a heating value associated with the liquid fuel, a contribution of the gaseous fuel to the operating condition can be determined from the difference in the actual operating condition measured by sensor 144 and the contribution of the first fuel source to the operating condition. The contribution of the gaseous fuel to the actual operating condition is then compared to a predetermined desired or target contribution of the gaseous fuel to the operating condition. The target contribution of the gaseous fuel to the operating condition can be obtained, for example, from a look-up table. Based on the comparison of the actual contribution and the target contribution of the gaseous fuel source to the operating condition, controller 200 then generates a plurality of output signals, indicated at 148, for variably controlling respective components of the system so as to effectively ensure, that the actual contribution of the gaseous fuel source is more closely aligned with the target contribution of the gaseous fuel source to the operating condition. Accordingly, the control system 120 effectively compensates for the difficulties in determining the flow rate and heating values associated with the gaseous fuel source and in predetermining the contribution of the gaseous fuel source to the operating conditions that occur during combustion in cylinder 31.

As discussed herein, control system 120 may include various components for optimizing the contribution of the gaseous fuel source to the operating conditions in cylinder 31. The objectives of, for example, low oxides of nitrogen (NOx) emissions, high efficiency, and/or maximization of substitution rate of the gaseous fuel without exceeding mechanical limits, such as injector tip temperature, peak cylinder pressure, and knock avoidance, may be achieved using any one of the various control components, or any combination of the components. In particular, as shown in FIGS. 1-2, compressor 50 may be provided in intake air system 22 upstream of intake manifold 28 for varying the boost intake pressure. Compressor 50 may be driven by any conventional means, such as an exhaust gas driven turbine 48. A bypass circuit 72 including a bypass valve 74 around compressor 50 and wastegate valve 70 around turbine 48 may be provided in a conventional manner. Charge air cooler 36 may also be provided downstream of compressor 24. Compressor 50, cooler 36 and turbine 48 each include control devices for varying the effect of the particular component on the operating condition of cylinder 31. For example, wastegate 70 could be used to regulate the amount of exhaust gas supplied from the associated exhaust system, which is connected to exhaust conduit 34, to turbine 48 thereby varying the intake pressure as desired. Similarly, control valve 74 or a control valve (not shown) for charge air cooler 36 could be provided to permit variable control of the intake charge flow and cooling of the charge flow. Output signals 148 from controller 200 are supplied to the various control devices to control compressor 50, cooler 36 and turbine 48 so as to variably control the pressure and temperature of the charge flow and amount of gaseous fuel in the charge flow on a cycle-by-cycle basis.

In certain embodiments of the systems disclosed herein, controller 200 is further structured to perform certain operations to control engine operations and fueling of cylinders 31 with fueling system 21 to provide the desired speed and torque outputs. In certain embodiments, the controller 200 forms a portion of a processing subsystem including one or more computing devices having memory, processing, and communication hardware. The controller 200 may be a single device or a distributed device, and the functions of the controller 200 may be performed by hardware or software. The controller 200 may be included within, partially included within, or completely separated from an engine controller (not shown). The controller 200 is in communication with any sensor or actuator throughout the systems disclosed herein, including through direct communication, communication over a datalink, and/or through communication with other controllers or portions of the processing subsystem that provide sensor and/or actuator information to the controller 200.

Certain operations described herein include operations to determine one or more parameters. Determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the parameter can be calculated, and/or by referencing a default value that is the parameter value.

The schematic flow description which follows provides an illustrative embodiment of a method for a dual fuelling mode of operation of internal combustion engine system 20. As used herein, a dual fuel system 21 is a fueling system in which a dual fueling mode is provided where each of the cylinders 31 of engine 30 receives a first fuel flow and a second fuel flow in addition to the first fuel flow under certain operating conditions. However, it is contemplated that the dual fueling system 21 can be operated in a single fuel mode from first fuel source 102 upon operator selection or certain operating conditions. Operations illustrated are understood to be exemplary only, and operations may be combined or divided, and added or removed, as well as re-ordered in whole or part, unless stated explicitly to the contrary herein. Certain operations illustrated may be implemented by a computer such as controller 200 executing a computer program product on a non-transient computer readable storage medium, where the computer program product comprises instructions causing the computer to execute one or more of the operations, or to issue commands to other devices to execute one or more of the operations.

Figure 4:
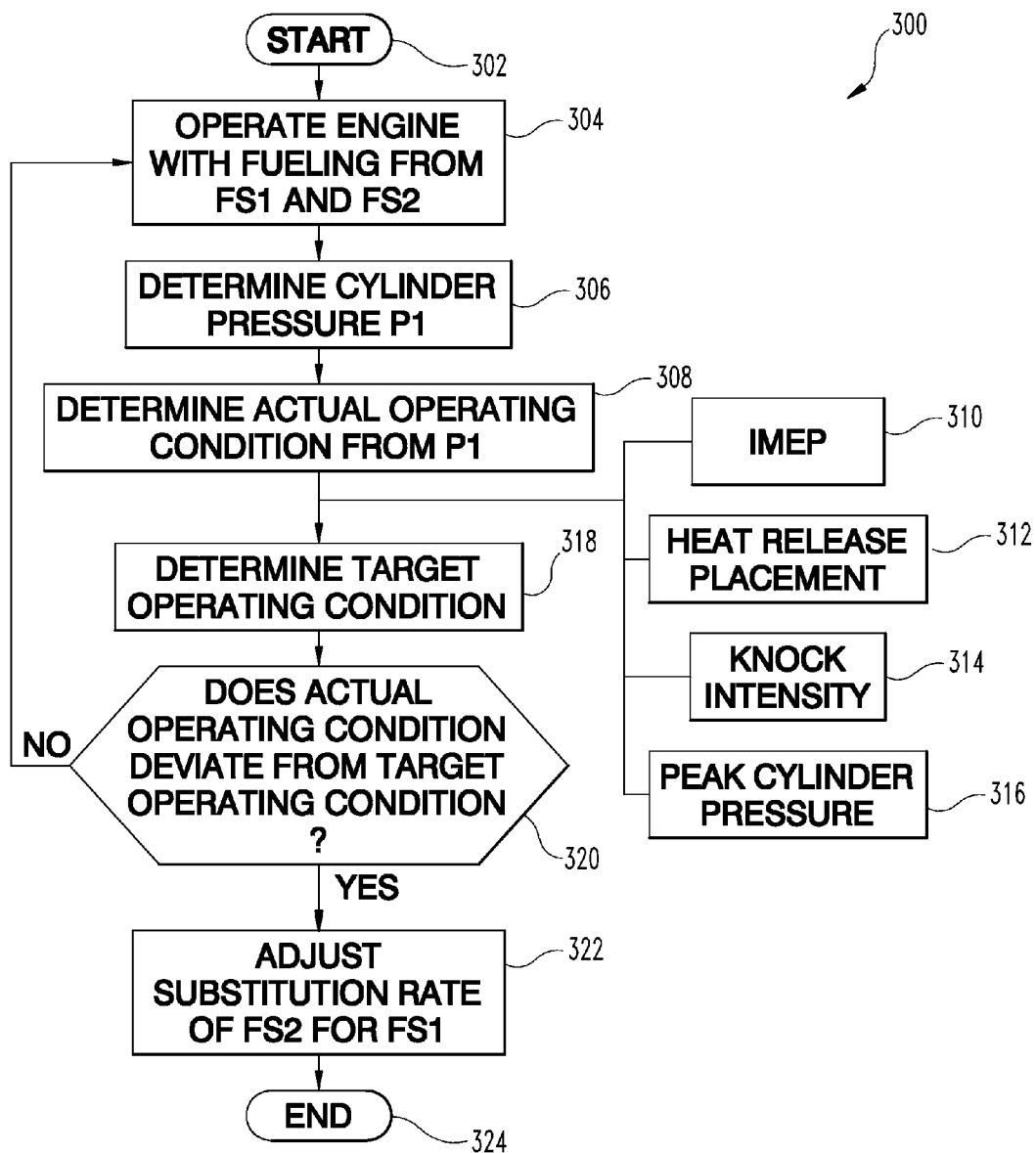
FIG. 4 is a flow diagram of example procedures for controlling operation of a dual fuel engine in response to an operating condition determined as a function of pressure in at least one combustion chamber in at least one cylinder.

In FIG. 4, one embodiment of a flow diagram for operating engine 30 with dual fuel system 21 is disclosed. Procedure 300 starts at 302 upon, for example, starting of engine 30. At operation 304 the operating conditions of engine 30 are determined in which engine 30 is operating with liquid fuel from first fuel source (FS1) 102 and gaseous fuel from second fuel source (FS2) 104. Procedure 300 continues at operation 304 to determine a cylinder pressure P1 in each of the cylinders 31 during a combustion cycle. Cylinder pressure P1 can be measured or calculated by controller 200 from pressure signals received from sensor 144. Cylinder pressure P1 may be a single pressure output at a stage of the combustion cycle, a peak pressure output during the combustion cycle, an indicated mean pressure (IMEP) over the combustion cycle, or other suitable pressure value or pressure values.

Based on the cylinder pressure P1, procedure 300 continues at operation 308 to determine an actual operating condition of cylinder 31 as a function of cylinder pressure P1. In one embodiment, the actual operating condition includes a total energy output of the cylinder during the combustion cycle. For example, operation 308 may include an operation 310 to determine the IMEP over the combustion cycle to provide an indication of the amount of torque produced by engine 30. By referencing combustion tables developed during production of engine 30 and stored on controller 200, the total fuelling energy delivered to the cylinder during the combustion cycle can be determined. Furthermore, since the amount of liquid fuel from first fuel source 102 is delivered in a known amount according to a fuelling command determined by controller 200 and with high accuracy, and since the liquid fuel has a known heating value, the contribution to the total fuelling energy from first fuel source 102 can be determined by controller 200. As a result, controller 200 can be programmed to determine the actual contribution of fuelling energy from second fuelling source 104 from the difference between the total fuelling energy and the contribution of fuelling energy provided from first fuelling source 102. The actual fuelling energy provided by the second fuel source corresponds to an actual substitution rate of the gaseous fuel for the liquid fuel, which actual substitution rate can be determined by reference to look up tables, operating maps or other data stored in controller 200.

From operation 310, procedure 300 continues at operation 318 to determine a target operating condition. In the example in which the actual contribution of fuelling energy from second fuel source 104 was determined at operations 308 and 310, the target operating condition can include a target substitution rate for the gaseous fuel and the resulting fuelling energy to be provided by the gaseous fuel from second fuel source 104. The target operating condition can be determined, for example, by providing engine operating parameters such as speed, torque request, exhaust flow rates, exhaust temperatures, intake pressure, etc. to controller 200 and determining a target substitution rate of the gaseous fuel for the liquid fuel that provides the desired fuelling energy according to look-up tables, operating maps and/or other information stored in controller 200. It is also contemplated that a cylinder pressure parameter can be the target operating condition, such as a centroid of heat release or parameter indicative thereof. If the centroid of heat release is too retarded, the target substitution rate of the gaseous fuel can be increased, and if the centroid of heat release is too advanced, the substitution rate of gaseous fuel can be reduced. In yet another embodiment, the target operating condition is the air-fuel ratio or lambda, in which the air flow can be increased or decreased to achieve the target operating condition while keeping the flow from the fuel sources fixed and/or maintaining the target substitution rate.

Procedure 300 continues at condition 320 in which it is determined whether the actual operating condition deviates from the target operating condition. For example, the actual energy contribution of the gaseous fuel to the energy output from the cylinder can be compared to the target contribution of the gaseous fuel to the energy output from the cylinder. If conditional 320 is negative, procedure 300 returns to operation 304 and continues as discussed above. If conditional 320 is positive, procedure 300 continues at operation 322 in which the substitution rate of gaseous fuel from FS1 is adjusted to compensate for the deviation of the actual operating condition from the target operating condition. Procedure 300 ends at 324 in response to, for example, a key-off event.

Other operating conditions that can be determined based on the cylinder pressure P1 can also be compared to target operating conditions for adjustment in the substitution rate of gaseous fuel from FS2. In another embodiment of operation 308, the actual operating condition includes an operation 312 to determine a heat release placement in the cylinder during the combustion cycle in response to cylinder pressure P1. As the substitution rate of gaseous fuel from FS2 is increased, the heat release placement in the cylinder also advances. In addition, the effective expansion ratio in the cylinder increases and the centroid of heat release also advances. These actual combustion parameters such as the actual heat release placement, effective expansion ratio, and/or centroid of heat release (or parameters indicative thereof) can be determined from pressure P1 and the relative location of piston 130 during the combustion cycle via, for example, a crank angle sensor. At operation 318 target combustion parameters can be determined for the actual heat release placement, effective expansion ratio, and/or centroid of heat, and compared to the actual combustion parameters determined at operation 312. The contribution of the liquid fuel to the combustion parameter is known from the timing and amount of injection of liquid fuel. The contribution of the gaseous fuel to the combustion parameter can be determined from the difference in the combustion parameter and the known contribution of the liquid fuel to the combustion parameter. If at conditional 322 a deviation in the contribution of the gaseous fuel to the combustion parameter from a target contribution of the gaseous fuel to the combustion parameter is determined, the substitution rate for gaseous fuel from FS2 for liquid fuel from FS1 can be adjusted to compensate for the deviation.

In yet a further embodiment, the air-to-fuel ratio or lambda of the charge flow is adjusted after determining the adjustment in the substitution rate for the gaseous fuel from FS2 at operation 322. For example, the air-to-fuel ratio of the charge flow can be increased or decreased to provide a targeted heat release placement, effective expansion ratio, and/or centroid of heat release. The air-to-fuel ratio of the charge flow can be adjusted by, for example, controlling wastegate 70, intake throttle 76, compressor bypass valve 74, and/or a variable geometry turbine while providing gaseous fuel at the adjusted substitution rate.

In yet another embodiment, the air-to-fuel ratio of the charge flow is set to a target that is, for example, stored in look-up tables in controller 200 and determined according to engine operating parameters. A deviation of the actual air-to-fuel ratio to the target air-to-fuel ratio is determined from the actual energy contribution of the gaseous fuel to the total energy output of the cylinder 31 as discussed above. The actual charge flow air-to-fuel ratio is determined by dividing the actual energy contribution from the gaseous fuel source with the mass air flow to the cylinder. The mass air flow can be measured or estimated by, for example, a speed density approach. Adjustments in the substitution rate of gaseous fuel from FS2 and/or in the intake air flow can be made to compensate for a deviation in the actual air-to-fuel ratio of the charge flow from the target air-to-fuel ratio.

In still other embodiments, operation 308 can include an operation 314 to determine the knock intensity from cylinder pressure P1 and/or an operation 316 to determine the peak cylinder pressure from cylinder pressure P1. For example, a high level of noise or ringing in the cylinder pressure trace in combustion chamber 132 can indicate a high level of knock intensity. High peak pressures can also affect operation and increase wear on components. In response to the knock intensity and/or peak pressure exceeding a threshold amount, controller 200 can adjust the substitution rate of gaseous fuel from FS2 by, for example, lowering boost pressures or retarding the injection timing of liquid fuel from FS2 to delay the start of combustion in the combustion cycle, or by leaning out the charge flow by controlling the opening an intake throttle 76 in the intake system 22 or closing of a wastegate 70 of the turbine 48 in the exhaust system 24.

Figure 5:
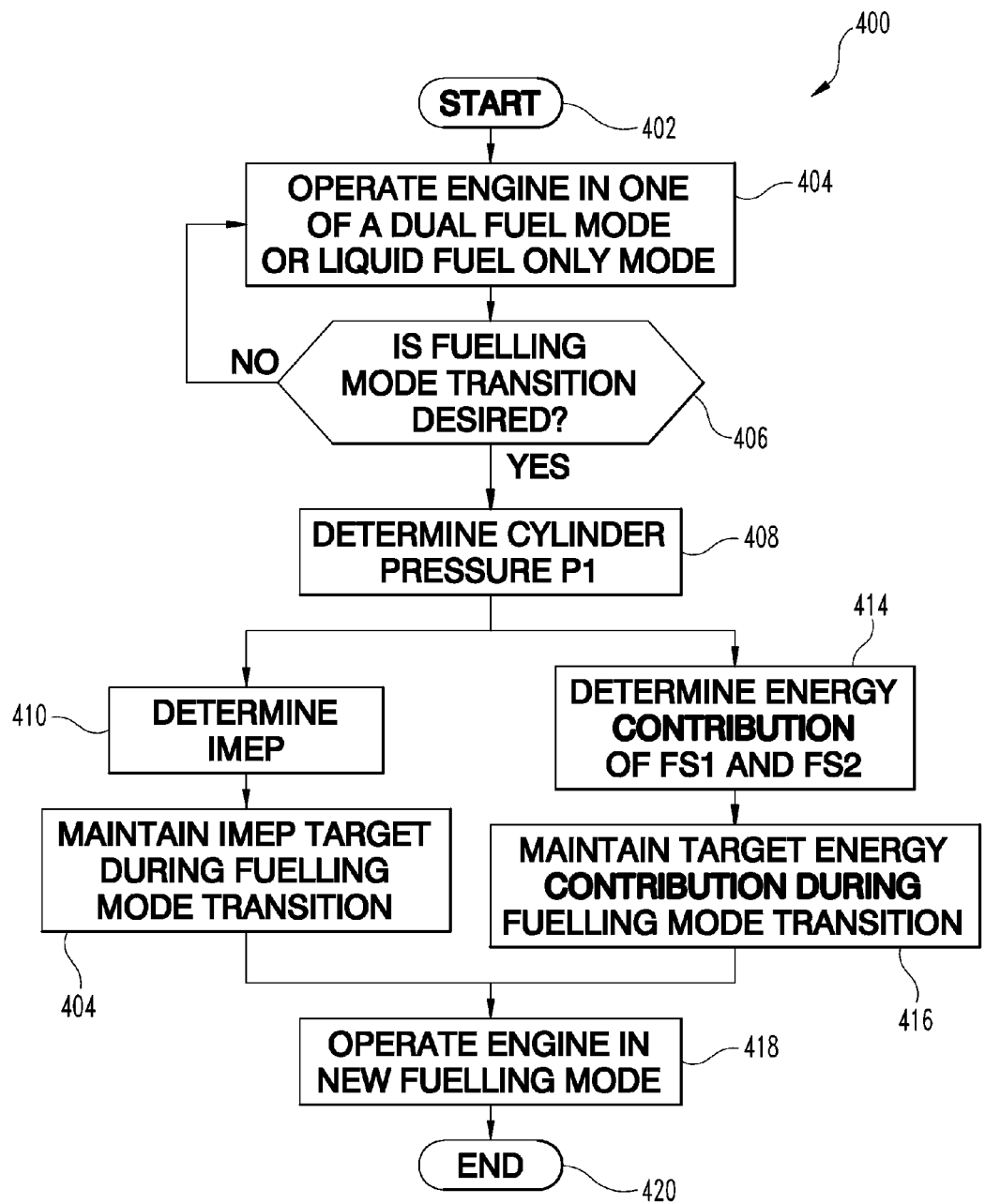
FIG. 5 is a flow diagram of another embodiment procedure for controlling operation of a dual fuel engine in response to a transition between fuelling modes.

Referring now to FIG. 5, another embodiment of a flow diagram for operating engine 30 with dual fuel system 21 is disclosed. Procedure 400 starts at 402 upon, for example, starting of engine 30. Procedure 400 continues at operation 404 in which engine 30 is fuelled in one of a dual fuel mode where engine is fuelled with fuel from each of FS1 and FS2 or a single fuel only mode where engine 30 is fuelled with liquid fuel only from FS1. Procedure 400 continues at conditional 406 where it is determined if a transition in the fuelling mode is desired from a dual fuel mode to a FS1-only mode, or from an FS1 only mode to a dual fuel mode. If conditional 406 is negative, procedure 400 returns to operation 404.

If conditional 406 is positive, procedure 400 continues at operation 408 to determine a cylinder pressure P1 in each of the cylinders 31 during a combustion cycle. Cylinder pressure P1 can be measured or calculated by controller 200 from pressure signals received from sensor 144. Cylinder pressure P1 may be a single pressure output at a stage of the combustion cycle, a peak pressure output during the combustion cycle, an indicated mean pressure (IMEP) over the combustion cycle, or other suitable pressure value or pressure values.

In one embodiment, procedure 400 continues from operation 408 at operation 410 to determine an actual operating condition that includes the actual IMEP of one or more cylinders 31. At operation 412 procedure 400 maintains an IMEP target that is based on the actual IMEP determined at operation 410 during the fuelling mode transition by adjusting one or more engine operating parameters during the fuelling mode transition. Adjusting the engine operating parameters can include, for example, adjusting the substitution rate of gaseous fuel for liquid fuel, manipulating an intake and/or exhaust throttle, opening or closing a wastegate or inlet of a VGT, increasing the engine speed, or adjusting some other operating parameter to maintain the IMEP target. The IMEP target may be the actual IMEP, a function of the actual IMEP, or an IMEP range based on the actual IMEP. From operation 412, procedure 400 continues at operation 418 to operate engine 30 in the new fuelling mode.

In another embodiment, procedure 400 continues from operation 408 at operation 414 to determine the energy contribution of FS1 and, if in a duel fuelling mode, the energy contribution of FS2, as discussed above. The energy contribution of FS1 and, when applicable, FS2 are used at operation 416 to determine an actual total energy contribution from fuelling, and to manage the fuelling mode transition to maintain a target total energy contribution during the fuelling mode transition at the actual energy contribution or as a function of the actual energy contribution determined at operation 414. From operation 416, procedure 400 continues at operation 418 to operate engine 30 in the new fuelling mode. Procedure 400 ends at 420 in response to, for example, the completion of the fuelling mode transition, a key-off event, or other termination event.

Various aspects of the systems and methods disclosed herein are contemplated. For example, one aspect relates to a method that includes operating an internal combustion engine system. The engine system includes an intake system connected to an engine with a plurality of cylinders and at least two fuel sources operably connected to the internal combustion engine system to provide a flow of liquid fuel to each of the plurality of cylinders and a flow of a gaseous fuel to each of the plurality of cylinders. The intake system is coupled to each of the plurality of cylinders to provide a charge flow from the intake system to a combustion chamber of the respective cylinder. The internal combustion engine system further includes an exhaust system. The method includes determining a pressure in the combustion chamber of at least one cylinder during a combustion cycle associated with the cylinder; determining at least one operating condition of the at least one cylinder as a function of the pressure; and adjusting a substitution rate of the gaseous fuel for the liquid fuel in response to the operating condition deviating from a target operating condition.

According to another aspect, a system is disclosed that includes an internal combustion engine including a plurality of cylinders with a pressure sensor associated with at least one of the cylinders, an exhaust system configured to receive exhaust from the plurality of cylinders, and an intake system configured to direct a charge flow to the plurality of cylinders. The intake system includes a compressor for compressing the charge flow. The system further includes a fuel system with a first fuel source operable to provide a liquid fuel to the plurality of cylinders and a second fuel source operable to provide a gaseous fuel to the plurality of cylinders. The system also includes a controller connected to the engine, the pressure sensor, the first fuel source, and the second fuel source. The controller is configured to receive pressure signals indicative of a pressure in the combustion chamber of the at least one cylinder during a combustion cycle associated with operation of the internal combustion engine and an operating condition of the at least one cylinder as a function of the pressure. The controller is further configured to adjust a substitution rate of the gaseous fuel for the liquid fuel in response to the operating condition.

Various embodiments of the systems and methods are contemplated. In one embodiment, a first part of the operating condition attributable to the liquid fuel is determined and a second part of the operating condition attributable to the gaseous fuel is determined. The second part of the operating condition is determined from a difference between the operating condition determined as a function of the pressure in the at least one cylinder and the first part of the operating condition. In one refinement, the pressure is an IMEP, operating condition is an energy output produced by combustion of the liquid fuel and gaseous fuel in the combustion chamber determined from the IMEP, and the first part of the operating condition is an energy contribution of the liquid fuel to the energy output determined from an amount of liquid fuel provided during the combustion cycle and the heating value of the liquid fuel. In a further refinement, the second part of the operating condition is an energy contribution of the gaseous fuel to the energy output, the energy contribution of the gaseous fuel is compared to a target contribution of the gaseous fuel to the energy output of the cylinder, and the substitution rate of the gaseous fuel is adjusted in response to the energy contribution of the gaseous fuel deviating from the target contribution. In another refinement, the second part of the operating condition is an energy contribution of the gaseous fuel to the energy output, an air-to-fuel ratio of the charge flow is determined from the energy contribution of the gaseous fuel and a mass air flow of the charge flow, the air-to-fuel ratio of the charge flow is compared to a target air-to-fuel ratio of the charge flow, and the charge flow is adjusted in response to the air-to-fuel ratio of the charge flow deviating from the target air-to-fuel ratio. In yet a further refinement, the charge flow is adjusted by opening or closing at least one of an intake throttle in the intake system, a compressor bypass valve in a compressor bypass, a wastegate of a turbine in the exhaust system, and a variable geometry turbine in the exhaust system. In another refinement, the charge flow is adjusted by varying the lift profile of at least one of an exhaust valve and an intake valve of the cylinder.

In another embodiment, the operating condition includes a combustion parameter in the combustion chamber of the cylinder during the combustion cycle. In one refinement, the combustion parameter is at least one of a heat release placement, an effective expansion ratio, and a parameter indicative of the centroid of heat release during the combustion cycle. In another refinement, the second part of the operating condition is a contribution of the gaseous fuel to the combustion parameter, the contribution of the gaseous fuel to the combustion parameter is compared to a target contribution of the gaseous fuel to the combustion parameter, and the substitution rate of the gaseous fuel for the liquid fuel is adjusted in response to the contribution of the gaseous fuel to the combustion parameter deviating from the target contribution of the gaseous fuel to the combustion parameter.

In another embodiment, a timing of injection of the liquid fuel into the combustion chamber is retarded in response to the knock intensity exceeding a threshold amount. In yet another refinement, the charge flow into the combustion chamber is leaned out in response to the knock intensity exceeding a threshold amount. In a further refinement, the charge flow is leaned out by at least one of opening an intake throttle in the intake system, closing a wastegate of a turbine in the exhaust system. In another embodiment, a substitution rate of the gaseous fuel is lowered in response to the knock intensity exceeding a threshold amount.

In another embodiment, the at least one operating condition is a peak pressure in the cylinder, and a pressure of the charge flow is reduced in response to the peak pressure exceeding a threshold amount.

In yet another embodiment, the liquid fuel is diesel fuel and the gaseous fuel is selected from the group consisting of natural gas, bio-gas, methane, propane, ethanol, producer gas, field gas, liquefied natural gas, compressed natural gas, or landfill gas. However, other types of primary and secondary fuels are not precluded, such as any suitable liquid fuel and gaseous fuel. In a further embodiment, the intake system includes an intake throttle downstream of the compressor and a controllable bypass around the compressor, and the exhaust system includes at least one of a variable geometry turbine and a wastegated turbine.

According to another aspect, a method includes operating an internal combustion engine system including an intake system connected to an engine with a plurality of cylinders and at least two fuel sources operably connected to the internal combustion engine system to provide a flow of liquid fuel to each of the plurality of cylinders in a first fuelling mode and, in a second fuelling mode, to provide a flow of a gaseous fuel to each of the plurality of cylinders in addition to the flow of liquid fuel. The intake system is coupled to each of the plurality of cylinders to provide a charge flow from the intake system to a combustion chamber of the respective cylinder and an exhaust system. The method includes determining a pressure in the combustion chamber of at least one cylinder during a combustion cycle associated with the cylinder; determining at least one actual operating condition as a function of the pressure; and transitioning from one of the first and second fuelling modes to the other of the first and second fuelling modes while maintaining a target operating condition as a function of the actual operating condition during the transition.

In one embodiment of the method, the at least one actual operating condition is an indicated mean effective pressure (IMEP) of the at least one cylinder and the target operating condition is a target IMEP. In another embodiment of the method, the at least one actual operating condition is a total energy contribution of the liquid fuel and the target operating condition is a target energy contribution of the liquid fuel and the gaseous fuel.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
    operating an internal combustion engine system including an intake system connected to an engine with a plurality of cylinders and at least two fuel sources operably connected to the internal combustion engine system to provide a flow of liquid fuel to each of the plurality of cylinders and a flow of a gaseous fuel to each of the plurality of cylinders, wherein the intake system is coupled to each of the plurality of cylinders to provide a charge flow from the intake system to a combustion chamber of the respective cylinder, the internal combustion engine system further including an exhaust system;
    determining a pressure in the combustion chamber of at least one cylinder during a combustion cycle associated with the cylinder;
    determining at least one operating condition of the at least one cylinder as a function of the pressure;
    determining a first part of the operating condition attributable to the liquid fuel;
    determining a second part of the operating condition attributable to the gaseous fuel, wherein the second part of the operating condition is determined from a difference between the operating condition in die at least one cylinder and the first part of the operating condition; and
    adjusting a substitution rate of the gaseous fuel for the liquid fuel in response to the operating condition deviating from a target operating condition.

2. The method of claim 1, wherein the pressure is an indicated mean effective pressure (IMEP), the operating condition is an energy output determined from the IMEP in response to combustion of the liquid fuel and gaseous fuel in the combustion chamber, and the first part of the operating condition is an energy contribution of the liquid fuel to the energy output determined from an amount of the liquid fuel provided during the combustion cycle and a heating value of the liquid fuel.

3. The method of claim 2, wherein the second part of the operating condition is an energy contribution of the gaseous fuel to the energy output, and further comprising:
    comparing the energy contribution of the gaseous fuel to a target contribution of the gaseous fuel to the energy output of the cylinder; and
    adjusting the substitution rate of the gaseous fuel in response to the energy contribution of the gaseous fuel deviating from the target contribution.

4. The method of claim 2, wherein the second part of the operating condition is an energy contribution of the gaseous fuel to the energy output, further comprising:
    determining an air-to-fuel ratio of the charge flow from the energy contribution of the gaseous fuel and a mass air flow of the charge flow;
    comparing the air-to-fuel ratio of the charge flow to a target air-to-fuel ratio of the charge flow; and
    adjusting the charge flow in response to the air-to-fuel ratio of the charge flow deviating from the target air-to-fuel ratio.

5. The method of claim 4, wherein adjusting the charge flow includes at least one of:
    opening or closing at least one of an intake throttle in the intake system, a compressor bypass valve in a compressor bypass, a wastegate of a turbine in the exhaust system, a variable geometry turbine in the exhaust system; and varying a lift profile of at least one of an intake valve and an exhaust valve of the cylinder.

6. The method of claim wherein the operating condition includes a combustion parameter in the combustion chamber of the cylinder during the combustion cycle.

7. The method of claim 6, wherein the combustion parameter is at least one of a heat release placement, an effective expansion ratio, and a centroid of heat release during the combustion cycle.

8. The method of claim 6, wherein the second part of the operating condition is a contribution of the gaseous fuel to the combustion parameter, and further comprising comparing the contribution of the gaseous fuel to a target contribution of the gaseous fuel to the combustion parameter, and adjusting the substitution rate of the gaseous fuel for the liquid fuel includes adjusting the substitution rate in response to the contribution of the gaseous fuel to the combustion parameter deviating from the target contribution of the gaseous fuel to the combustion parameter.

9. The method of claim 1, wherein determining at least one operating condition includes detecting a knock intensity from the pressure in the at least one cylinder.

10. The method of claim 9, further comprising retarding a timing of injection of the liquid fuel into the combustion chamber in response to the knock intensity exceeding a threshold amount.

11. The method of claim 9, further comprising leaning out the charge flow into the combustion chamber in response to the knock intensity exceeding a threshold amount.

12. The method of claim 11, wherein leaning out the charge flow includes at least one of opening an intake throttle in the intake system and closing a wastegate of a turbine in the exhaust system.

13. The method of claim 9, further comprising lowering the substitution rate of the gaseous fuel in response to the knock intensity exceeding a threshold amount.

14. The method of claim 1, wherein determining the at least one operating condition includes determining a peak pressure in the cylinder, and further comprising reducing a pressure of the charge flow in response to the peak pressure exceeding a threshold amount.

15. The method of claim 1, wherein the liquid fuel is diesel fuel and the gaseous fuel is selected from the group consisting of natural gas, bio-gas, methane, propane, ethanol, producer gas, field gas, liquefied natural gas, compressed natural gas, and landfill gas.

16. A system, comprising:
an internal combustion engine including a plurality of cylinders, at least one of the plurality of cylinders including a pressure sensor in communication with a combustion chamber of the at least one cylinder;
an exhaust system configured to receive exhaust from the plurality of cylinders;
an intake system configured to direct a charge flow to the plurality of cylinders, wherein the intake system includes a compressor for compressing the charge flow;
a fuel system including a first fuel source operable to provide a liquid fuel to the plurality of cylinders and a second fuel source operable to provide a gaseous fuel to the plurality of cylinders; and
a controller connected to the internal combustion engine, the pressure sensor, the first fuel source, and the second fuel source, wherein the controller is configured to
receive a pressure signal indicative of a pressure in the combustion chamber of the at least one cylinder during a combustion cycle associated with cylinder,
determine an operating condition of the at least one cylinder as a function of the pressure,
determine a first part of the operating condition attributable to the liquid fuel,
determine a second part of the operating condition attributable to the gaseous fuel from a difference between the operating condition in the at least one cylinder and the first part of the operating condition, and
adjust a substitution rate of the gaseous fuel for the liquid fuel in response to the operating condition.

17. The system of claim 16, wherein the liquid fuel is diesel fuel and the gaseous fuel is selected from the group consisting of natural gas, bio-gas, methane, propane, ethanol, producer gas, field gas, liquefied natural gas, compressed natural gas, or landfill gas.

18. The system of claim 16, wherein the pressure is an indicated mean effective pressure (IMEP) in the cylinder during the combustion cycle, the operating condition includes an energy output determined from the IMEP in response to combustion of the liquid fuel and gaseous fuel in the combustion chamber, and the first part of the operating condition is an energy contribution of the liquid fuel to the energy output determined from an amount of the liquid fuel provided during the combustion cycle and a heating value of the liquid fuel.

19. The system of claim 18, wherein the second part of the operating condition is an energy contribution of the gaseous fuel to the energy output and the controller is configured to:
compare the energy contribution of the gaseous fuel to a target energy contribution of the gaseous fuel to the energy output of the cylinder; and
adjust the substitution rate of the gaseous fuel for the liquid fuel in response to the contribution of the gaseous fuel to the energy output deviating from the target energy contribution of the gaseous fuel.

20. The system of claim 18, wherein the second part of the operating condition is an energy contribution of the gaseous fuel to the energy output and the controller is configured to:
determine an air-to-fuel ratio of the charge flow from the energy contribution of the gaseous fuel and a mass air flow of the charge flow;
compare the air-to-fuel ratio of the charge flow to a target air-to-fuel ratio of the charge flow; and
adjust the charge flow in response to the air-to-fuel ratio deviating from the target air-to-fuel ratio.

21. The system of claim 20, wherein the controller is configured to adjust the charge flow by controlling at least one of an intake throttle in the intake system, a compressor bypass valve in a compressor bypass, a wastegate in a turbine of the exhaust system, and a variable geometry turbine in the exhaust system.

22. The system of claim 16, wherein the operating condition includes a combustion parameter in the combustion chamber of the cylinder during the combustion cycle.

23. The system of claim 22, wherein the second part of the operating condition includes a contribution of the gaseous fuel to the combustion parameter in the cylinder and the controller is configured to:
compare the contribution of the gaseous fuel to the combustion parameter to a target contribution of the gaseous fuel to the combustion parameter of the cylinder; and adjust the substitution rate of the gaseous fuel for the liquid fuel in response to the contribution of the gaseous fuel to the combustion parameter deviating from the target contribution.

24. The system of claim 16, wherein the controller is configured to detect a knock intensity from the pressure in the at least one cylinder and retard a timing of injection of the liquid fuel into the combustion chamber in response to the knock intensity exceeding a threshold amount.

25. The system of claim 16, wherein the controller is configured to detect a knock intensity from the pressure in the at least one cylinder and lean out the charge flow into the combustion chamber in response to the knock intensity exceeding a threshold amount.

26. The system of claim 16, wherein the intake system includes an intake throttle downstream of the compressor and a controllable bypass around the compressor, and the exhaust system includes at least one of a variable geometry turbine and a wastegated turbine.

27. The system of claim 16, wherein the controller is configured to detect a knock intensity from the pressure in the at least one cylinder and lower the substitution rate of the gaseous fuel in response to the knock intensity exceeding a threshold amount.

28. A method, comprising:
operating an internal combustion engine system including an intake system connected to an engine with a plurality of cylinders and at least two fuel sources operably connected to the internal combustion engine system to provide a flow of liquid fuel to each of the plurality of cylinders in a first fuelling mode and, in a second fuelling mode, to provide a flow of a gaseous fuel to each of the plurality of cylinders in addition to the flow of liquid fuel, wherein the intake system is coupled to each of the plurality of cylinders to provide a charge flow from the intake system to a combustion chamber of the respective cylinder, the internal combustion engine system further including an exhaust system;

determining a pressure in the combustion chamber of at least one cylinder during a combustion cycle associated with the cylinder;

determining at least one actual operating condition as a function of the pressure;

determining a first part of the operating condition attributable to the liquid fuel;

determining a second part of the operating condition attributable to the gaseous fuel, wherein the second part of the operating condition is determined from a difference between the operating condition in the at least one cylinder and the first part of the operating condition; and transitioning from one of the first and second fuelling modes to the other of the first and second fuelling modes while maintaining a target operating condition during the transition as a function of the actual operating condition before the transition.

29. The method of claim 28, wherein the at least one actual operating condition is an indicated mean effective pressure (IMEP) of the at least one cylinder and the target operating condition is a target IMEP.

30. The method of claim 28, wherein the at least one actual operating condition is a total energy contribution of the liquid fuel and the gaseous fuel and the target operating condition is a target energy contribution of the liquid fuel and the gaseous fuel during the transition.

* * * * *